United States Patent [19]

Kawamura

[11] Patent Number: 4,694,654
[45] Date of Patent: Sep. 22, 1987

[54] EXHAUST ENERGY RECOVERY AND GENERATOR FOR USE WITH AN ENGINE

[75] Inventor: Hideo Kawamura, Samukawa, Japan

[73] Assignee: Isuzu Motors Limited, Tokyo, Japan

[21] Appl. No.: 666,058

[22] Filed: Oct. 29, 1984

[30] Foreign Application Priority Data

| Oct. 29, 1983 | [JP] | Japan | 58-203238 |
| Oct. 31, 1983 | [JP] | Japan | 58-204569 |
| Mar. 17, 1984 | [JP] | Japan | 59-51558 |

[51] Int. Cl.$^4$ .......................................... F02B 37/00
[52] U.S. Cl. ....................................... 60/605; 60/602;
290/52; 310/102 R; 310/156; 310/168; 363/37;
415/212 R
[58] Field of Search ............... 60/602, 605, 624, 597;
310/156, 168, 68 R, 102 R, DIG. 3, 113;
290/52; 415/212 R, 214; 363/37

[56] References Cited

U.S. PATENT DOCUMENTS

| 3,007,302 | 11/1961 | Vincent | 60/605 R |
| 3,062,979 | 11/1962 | Jarret et al. | |
| 3,217,194 | 11/1965 | Terry et al. | |
| 3,529,222 | 9/1970 | Gaitten | 363/37 |
| 3,849,682 | 11/1974 | Binns | 310/156 |
| 3,968,390 | 7/1976 | Yasuda | 310/156 |
| 4,253,031 | 2/1981 | Frister | 290/52 |
| 4,280,797 | 7/1981 | Pfeil | 415/212 R |
| 4,391,098 | 7/1983 | Kosuge | 60/605 R |
| 4,394,582 | 7/1983 | Kreissl | 290/52 |
| 4,406,958 | 9/1983 | Palmero | 310/156 |
| 4,408,959 | 10/1983 | Long | 415/214 |
| 4,545,464 | 10/1985 | Nomura | 363/37 |

FOREIGN PATENT DOCUMENTS

| 0057544 | 2/1981 | European Pat. Off. | |
| 0052913 | 6/1982 | European Pat. Off. | |
| 197483 | 4/1907 | Fed. Rep. of Germany . | |
| 2941240 | 4/1981 | Fed. Rep. of Germany | 60/597 |
| 2499326 | 8/1982 | France . | |
| 2519483 | 7/1983 | France . | |
| 192652 | 11/1937 | Switzerland . | |
| 1437532 | 5/1976 | United Kingdom | 415/212 A |
| 2021874 | 12/1979 | United Kingdom . | |
| 2063368 | 6/1981 | United Kingdom . | |
| 2117188 | 10/1983 | United Kingdom . | |

Primary Examiner—Douglas Hart
Attorney, Agent, or Firm—Staas & Halsey

[57] ABSTRACT

An engine is composed of an exhaust turbine rotatable by the exhaust energy of an exhaust gas discharged from the engine, a generator coupled to the exhaust turbine, and a motor drivable by the generator. The energy recovered from the exhaust gas by the exhaust turbine is fed back to an output shaft of the engine through the generator and the motor. The engine may have a second exhaust turbine located downstream of the first-mentioned exhaust turbine in an exhaust passage for driving an intake air compressor. The exhaust gas may be introduced directly into the second exhaust turbine by a bypass passage. In a generator device used with the engine, the generator includes a rotor shaft coupled coaxially with a turbine wheel shaft of the exhaust turbine. The turbine wheel, the wheel shaft, and the rotor shaft are constructed of ceramics preferably as an integral structure. The rotor shaft is rotatably supported by oil floating bearings. On the rotor shaft, there is mounted a magnet rotor of a rare earth metal kept in position by holder plates held against opposite axial ends of the magnet rotor. A carbon wire is coiled around the magnet rotor. Alternatively, a magnet housing is mounted on the rotor shaft and comprises a plurality of housing members held axially together, and a magnet of a rare earth metal is accommodated in recesses in each pair of housing members.

8 Claims, 8 Drawing Figures

EXHAUST ENERGY RECOVERY AND GENERATOR FOR USE WITH AN ENGINE

BACKGROUND OF THE INVENTION

The present invention relates to an exhaust energy recovery and generator device for use with an engine (referred to hereinafter as a "generator device").

Internal combustion engines, such as gasoline engines and diesel engines, produce a power output by combusting fuel in cylinders to generate an energy with which the pistons are lowered. An exhaust gas produced by the combustion of the fuel in the cylinder is discharged through an exhaust manifold into the atmosphere. The exhaust gas has a high temperature and a high pressure and still retains a considerable amount of energy.

There has recently been developed a thermally insulative internal combustion engine with various parts constructed of ceramics, including an outer wall of an exhaust manifold, a cylinder liner, a heat-insulative plate on a cylinder head, an exhaust valve, and a piston, for example. This type of internal combustion engine is not designed to radiate heat generated therein to cool the engine, but is rather designed to recover the energy of an exhaust gas which is of a higher temperature than that of the exhaust gas emitted from conventional engines, thus increasing the operation efficiency of the engine. One conventional exhaust energy recovery device includes a turbine disposed near an exhaust port and rotatable by an exhaust gas for producing excessive rotative power which is reduced in speed by a number of speed reducer gears and fed back to a crank shaft. However, the prior exhaust energy recover device has been disadvantageous and ineffective in that it is complex in overall construction, making the internal combustion engine costly, has a poor operation efficiency, and cannot be used under a partial load.

There is known another exhaust energy recovery device for use with an ordinary engine having an engine cooling device, rather than with the thermally insulative engine. The exhaust energy recovery device has a turbine disposed near an exhaust port and rotatable by an exhaust gas, and an air compressor rotatable by the turbine for feeding air under pressure into an intake manifold to increase the engine operation efficiency when the engine rotates at a high speed and under a high load. The turbine is required to operate at high speeds for supplying compressed air effective for high engine rotational speeds. However, the turbine fails to supply such effective compressed air when the exhaust gas flows at a low speed, that is, the turbine cannot feed air into the engine when the engine rotates at a low speed and under a high load. Another drawback is that when the engine rotates at a high speed, the turbine tends to supply an excessive amount of air under pressure into the engine, and it is necessary to discharge a portion of the exhaust gas through a bypass passage into the atmosphere. Such a bypass passage discharges the entire exhaust energy into the atmosphere when the engine rotates at a low speed. Accordingly, the exhaust energy recovery device fails to utilize the exhaust energy effectively.

According to the process of recovering the exhaust gas energy from an internal combustion engine in the form of a torque or power, as described above, the exhaust turbine is rotated by the exhaust gas energy, and rotative power from the exhaust turbine is applied through a train of gears to the crank shaft of the engine.

With the above exhaust energy recovery process, however, the turbine cannot respond well to variations in the speed of flow of the exhaust gas. The speed reducer required to reduce the high speed of rotation of the exhaust turbine has not yet been practically available since it would be highly complex in construction and reduce the efficiency of transmitting power.

There have heretofore been used induction generators to be driven by exhaust turbines, the induction generators having permanent magnet rotors to withstand centrifugal forces applied thereto. However, limitations have been imposed on the speed of rotation of the rotor due to the strength of the magnet and weak magnetic forces thereof when the rotor is to be rotated at high speeds. As a consequence, it has been difficult to manufacture a high-power generator of this type.

Generators generate greater electric power as the rotor rotates at a higher speed. Therefore, the generators as they are driven by exhaust turbines rotated at high speeds by the exhaust energy are most effective means for efficiently utilizing the exhaust energy.

For driving a synchronous generator with an exhaust turbine and supplying regenerative energy to an internal combustion engine, it has been customary to pick up an induced voltage from a rotor winding through a brush or from a stator winding disposed around the permanent magnet rotor. Such an arrangement causes no problem if incorporated in an ordinary generator having a rotor speed of about 3,000 rpm. However, if a rotor speed were 20,000 rpm or higher, then the generator would be damaged due to increased friction, or frictional or sliding shocks.

The generator with the permanent magnet cannot generate a sufficiently large amount of electric power and hence cannot have a large power generation capacity since the permanent magnet of metal produces only small magnetic forces.

SUMMARY OF THE INVENTION

It is an object of the present invention to provide an exhaust energy recovery and generator device for use with an engine system with an capable of highly efficiently recovering the energy of an exhaust gas for increasing the operation efficiency of the engine and making a supercharging operation effective, the generator device being capable of high-speed rotation and producing a sufficiently large amount of electric power.

Another object of the present invention is to provide a generator device of the foregoing type having a rotor shaft coupled coaxially with the turbine impeller shaft of an exhaust turbine for high-speed rotation.

Still another object of the present invention is to provide a generator device of the type described above, which has a generator of sufficient mechanical strength to provide against high-speed rotation and includes a rotor for producing stroke magnetic forces, thus enabling the generator to produce a high power output and operate highly efficiently.

A still further object of the present invention is to provide a generator device of the type described above including a reluctance generator having a mechanism strength large enough to withstand high-speed rotation.

According to the present invention, there is provided an exhaust energy recovery and generator device for an engine including an exhaust turbine disposed in an exhaust passage of the engine and rotatable by the energy of an exhaust gas discharged from the engine, a generator having a rotor shaft connected to a turbine shaft of the exhaust turbine, a motor drivable by the generator, and means connecting a rotatable shaft of the motor to an output shaft of the engine, whereby the energy of the exhaust gas recovered by the exhaust turbine can be fed back to the output shaft of the engine through the generator and the motor, the exhaust turbine including a turbine wheel having a wheel shaft coupled coaxially with the rotor shaft of the generator.

The turbine wheel of the exhaust turbine is constructed of ceramics. The rotor shaft of the generator also is constructed of ceramics. Preferably, the turbine wheel, the wheel shaft, and the rotor shaft are constructed integrally of ceramics. The rotor shaft of the generator is rotatably supported by oil floating bearings.

The generator device further includes a magnet rotor of a rare earth metal fitted over the rotor shaft of the generator, holder members mounted on the rotor shaft and held against opposite ends of the magnet rotor, and a carbon wire coiled around a circumferential surface of the magnet rotor.

Alternatively, the generator device further includes a magnet housing fitted over the rotor shaft of the generator and composed of housing members held axially together and each having a central hole through which the rotor shaft extends and a recess defined in at least one surface thereof, and a magnet of a rare earth metal disposed in the recesses in each pair of housing members.

The generator device further includes a body of silicon steel fitted over the rotor shaft of the generator, and a stator coil for passing an armature current which is 90° advanced in phase through a winding which generates a no-load induced electromotive force, whereby the generator serves as a reluctance generator.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
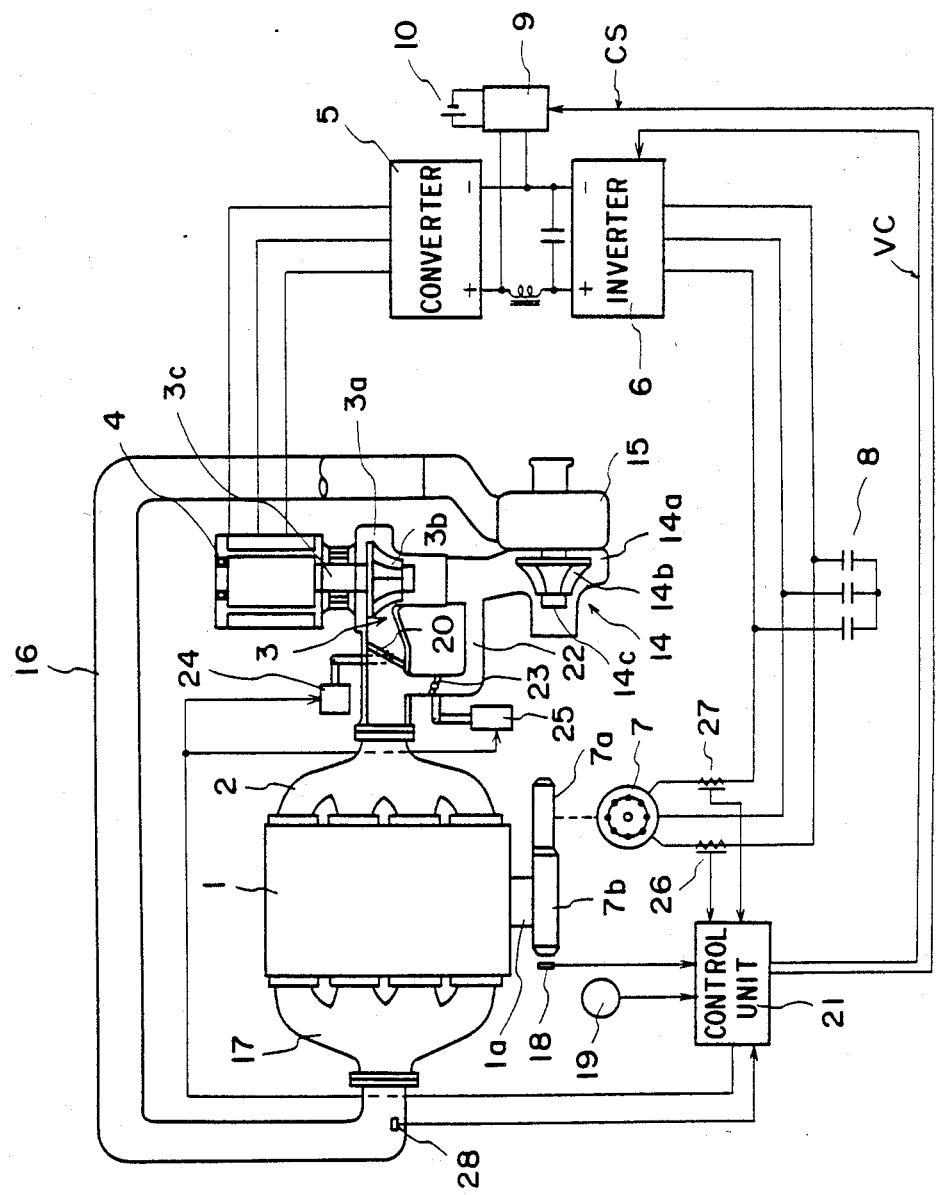
FIG. 1 is a schematic representation of a thermally insulative engine according to the present invention.

FIG. 1 illustrates a thermally insulative engine according to the present invention. The thermally insulative engine is mounted typically on an automobile.

The thermally insulative engine, indicated by the reference numeral 1, have various parts made of ceramics, the parts including a cylinder liner, a heat-insulative plate for a cylinder head, an exhaust valve, and a piston, for example. An exhaust manifold 2 has a heat-insulative construction with its outer wall made of ceramics. A first exhaust turbine 3 is coupled to an end of the exhaust manifold 2. The first exhaust turbine 3 is of the high-speed type which produces an effective output when rotating at a high speed since a high-temperature, high-speed exhaust gas from the exhaust manifold 2 passes through the first exhaust turbine 3. The first exhaust turbine 3 includes a turbine swirl chamber 3a in which a turbine wheel 3b is rotatably disposed.

A high-voltage AC generator 4 has a rotatable shaft coupled directly with a turbine shaft 3c of the exhaust turbine 3. The AC generator 4 comprises a bipolar AC generator having a rotor constructed of a permanent magnet and a stator on which an armature winding is mounted. Since the AC generator 4 is driven by the exhaust turbine 3 to rotate at up to about 100,000 rpm, the rotor is of a slender configuration elongated in the axial direction of the rotatable shaft to reduce centrifugal forces imposed on the rotor as it rotates at a high speed, thus preventing the rotor from being damaged or broken. The AC generator 4 as it rotates at a high speed generates an alternating voltage of about 200 v, which is high for automotive use, at a frequency of about 3.5 KHz. A converter 5 composed of a thyristor bridge serves to convert an alternating current generated by the AC generator 4 into a direct current (including ripples). The thyristors of the converter 5 are high-frequency thyristors designed to sufficiently operate at the frequency of about 3.5 KHz. The direct current produced by the converter 5 is converted by an inverter 6 into an alternating current. The inverter 6 generates an alternating current having a frequency commanded by a command signal VC supplied from a control unit 21, described later, the frequency being in the range of from a few tens Hz to a few hundreds Hz dependent on the rotational speed of the engine 1. An induction motor 7 has a rotatable shaft coupled to an output shaft 1a of the engine 1 through two gears 7a, 7b. Designated in FIG. 1 is element 8 phase-advancer capacitors; 9 a switching circuit controlled to be turned on and off by a control signal CS from the control unit 21; and 10 a high-voltage battery 10.

A second exhaust turbine 14 is connected to an outlet end of the first exhaust turbine 3 for recovering residual exhaust gas energy. The second exhaust turbine 14 is of the low-speed type for producing most effective compressed air when the exhaust gas flows therethrough at a relatively low speed. The second exhaust turbine 14 includes a turbine swirl chamber 14a in which a turbine wheel 14b is rotatably disposed. An intake air compressor 15 has a rotatable shaft directly coupled to a turbine shaft 14c of the second exhaust turbine 14. Air compressed by the intake air compressor 15 is supplied under pressure into an intake manifold 17 through a pipe 16. An exhaust bypass passage or circuit 22 serves to direct an exhaust gas from the exhaust manifold 2 directly to the second exhaust turbine 14. A main valve 20 is disposed in a passage between the exhaust manifold 2 and the first exhaust turbine 14 and can be opened and closed by an actuator 24. A bypass valve 23 is disposed in the bypass passage 22 and can be opened and closed by an actuator 25. A speed sensor 18 comprising a pickup coil, for example, is positioned adjacent to the gear 7b for counting the number of teeth thereof having moved past the speed sensor 18. A load detector 19 serves to detect the load imposed on the engine 1 based on a rack position or the extent to which an accelerator pedal is depressed.

The control unit 21 is responsive to data supplied from the speed sensor 18 and the load detector 19 for calculating the amount of an exhaust gas to be fed to the first exhaust turbine 3 and the amount of an exhaust gas to be fed directed to the second exhaust turbine 14 while bypassing the first exhaust turbine 3. Signals indicative of the amounts of the exhaust gases are supplied from the control unit 21 to the actuators 24, 25, respectively, for controlling the opening of the main and bypass valves 20, 23. The control unit 21 is also responsive to output signals from current detectors 26, 27 for issuing a command signal VC for operating the inverter 6 in a power or regenerative mode and also for issuing a control signal CS to turn on or off the switching circuit 9. Denoted at 28 is an air pressure sensor.

When the engine 1 is to be started, the main valve 20 is fully open and the bypass valve 23 is fully closed, so that an exhaust gas discharged from the engine 1 will flow entirely into the exhaust turbine 3.

When the engine 1 starts rotating, the exhaust gas of a high temperature is fed under pressure into the first exhaust turbine 3 to start rotating the turbine wheel 3b of the first exhaust turbine 3. The AC generator 4 is now driven to generate AC electric power having a high frequency. The AC electric power is converted by the converter 5 into DC electric power which is then converted by the inverter 6 into an alternating current of a low frequency capable of energizing the induction motor 7. However, since the speed of rotation of the first exhaust turbine 3 is low at this time, the output power from the AC generator 4 is small and cannot energize the induction motor 7.

As the speed of rotation of the engine 1 is increased to discharge an exhaust gas under a higher pressure at a higher temperature, the output power from the AC generator 4 is increased. When the output power from the inverter 6 becomes greater than a counterelectromotive force of the induction motor 7, the inverter 6 operates in a power mode thereby to drive the induction motor 7. Since the induction motor 7 drives the output shaft 1a in a direction to increase the output therefrom, the energy of the exhaust gas is recovered and fed back to the output shaft 1a of the engine 1.

When the engine 1 operates under a partial load, a considerable amount of energy remains in the exhaust gas which has rotated the first exhaust turbine 3. The residual exhaust energy that has not been recovered by the first exhaust turbine 3 then passes through the second exhaust turbine 14, whereupon the turbine wheel 14b starts to rotate. The intake air compressor 15 coupled with the turbine wheel 14b is then driven to supply compressed air through the pipe 16 into the intake manifold 17. Under the partial engine load, however, no significant amount of air is fed under pressure into the intake manifold 17. When the engine 1 rotates at a higher speed under a full load at the time the automobile runs at a high speed, the exhaust gas is discharged at a higher temperature under a higher pressure, and hence the energy of the exhaust gas having passed through the first exhaust turbine 3 and reached the second exhaust turbine 14 is increased. The pressure of air supplied to the intake manifold 17 through the pipe 16 is also increased to approach an intercept point. The control unit 21 detects such an air pressure increase through the signal from the air pressure sensor 28, and applies a command signal VC to the inverter 6 to operate the induction motor 7 in a maximum power mode. Thus, the energy fed back to the engine 1 is maximized to increase the load on the first exhaust turbine 3. Then, the speed of rotation of the second exhaust turbine 14 is reduced to keep the air pressure in the intake manifold 17 below the intercept point. When the air pressure in the intake manifold 17 is further increased as the load on the engine 1 is increased, the switching circuit 9 is energized to store energy in the battery 10, so that the load on the first exhaust turbine 3 is increased and the speed of rotation of the second exhaust turbine 14 is reduced; thereby lowering the air pressure in the intake manifold 17.

It is generally known that when the engine 1 rotates at a low speed and under a high load, e.g., when the automobile runs up a sloping road with a low gear, the amount of air drawn from the intake manifold 17 tends to be lower than an ideal amount of air to be drawn in. Under this condition, the supply of the exhaust gas into the first exhaust turbine 3 is limited by the main valve 20, and the bypass valve 23 is opened to supply the exhaust gas directly into the second exhaust turbine 14. Therefore, an amount of compressed air optimum for fuel combustion is fed under pressure into the intake manifold 17. Since the second exhaust turbine 14 is of the low-speed type, an effective amount of air can be supplied thereby into the engine.

The main valve 20 and the bypass valve 23 are opened and closed under the control of the control unit 21. The control unit 21 reads data from the speed sensor 18 and the load detector 19, computes the extent to which the main valve 20 and the bypass valve 23 are to be opened to meet the speed of and the load on the engine 1 at the time, and issues control signals indicative of the extent of such valve openings to the corresponding actuators 24, 25.

Generator devices according to preferred embodiments of the present invention will be described with reference to FIGS. 2 through 8.

Figure 2:
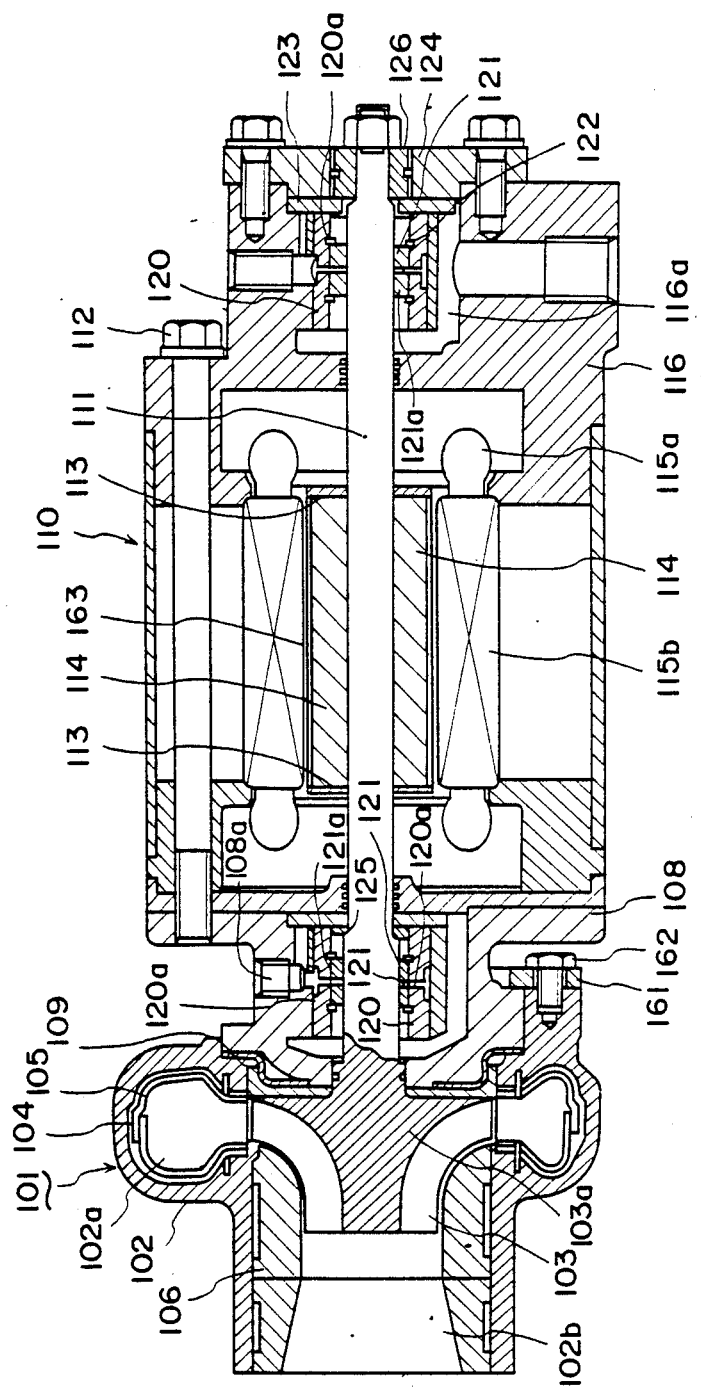
FIG. 2 is a longitudinal cross-sectional view of a generator device according to the present invention.

In FIG. 2, an exhaust turbine 101 comprises a turbine housing 102 having a scroll 102a and a turbine wheel or impeller 103 rotatably disposed in the turbine housing 102. The scroll 102a is coupled to the exhaust pipe of an internal combustion engine for introducing an exhaust gas from the exhaust pipe to rotate the turbine wheel 103 with the energy of the exhaust gas. The exhaust gas having rotated the turbine wheel 103 is discharged through an axial outlet port 102b and an exhaust pipe coupled therewith.

On an inner wall surface of the scroll 102a, there is mounted a heat-insulative wall 105 made of a heat-resistant metal, such as stainless steel, with a heat insulator 104, such as of ceramic fibers, interposed between the wall 105 and the inner wall surface of the scroll 102a. A heat-insulative guide 106 made of a heat-insulative material, such as ceramics, is disposed on an inner surface of an tubular exhaust portion of the housing 102 for preventing thermal radiation of the exhaust gas through the housing 102.

Figure 3:
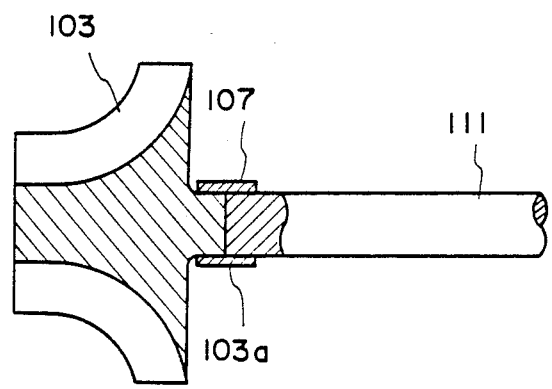
FIG. 3 is a cross-sectional view of a coupling mechanism by which a turbine impeller and a generator rotor shaft are interconnected in the generator device of the invention.

The turbine wheel 103 is made of ceramics such as silicon nitride having a high strength against heat, the turbine wheel 103 having an integral wheel shaft 103a. A generator 110 includes a rotor shaft 111 disposed coaxially with the wheel shaft 103a, the rotor shaft 111 being integrally formed of ceramics with the turbine wheel 103 and the wheel shaft 103a. The wheel shaft 103a and the rotor shaft 111 may be separately formed of ceramics as shown in FIG. 3. With such an alternative, they are interconnected by a connecting sleeve 107 and made of a metal such as Kovar having substantially the same coefficient of thermal expansion as that of ceramics, the connecting sleeve 107 being first fitted over the wheel shaft 103a and the rotor shaft 111 and then joined to them by being metallized. It is preferable that the rotor shaft 111 be formed of a ceramics material such as cermet having a large Young's modulus. A bearing housing 108 is fixed to a side of the turbine housing 102 with a heat insulator 109 interposed therebetween. The bearing housing 108 is secured in position by an attachment plate 161 fastened by a bolt 162. The generator 110, in turn, is secured in position to the bearing housing 108 by bolts, such as 112.

The generator 110 comprises, in addition to the rotor shaft 111, a magnet rotor 114 fitted over the rotor shaft 111 and made of a rare earth metal capable of producing stroke magnetic forces, stator coils 115a and stator coils 115b mounted on the magnet rotor 114 in diametrically opposite positions, and a bearing housing 116 by which one end of the rotor shaft 111 is rotatably supported.

The magnet rotor 114 produces much stronger magnetic forces than those of ordinary magnets, and having a residual flux density Br ranging from 5,000 to 9,500 wb/cm and a coercive force ranging from 4,500 to 9,500 A/m. Although the magnet motor 114 is best suited for use as a magnet, it could not be used solely as a magnet rotor in a high-speed generator subjected to large centrifugal forces since the magnet rotor 114 has quite a small deflective and tensile strength. Therefore, the magnet rotor 114 is firmly mounted on the rotor shaft 111 by ring-shaped holder plates 113 held against axial ends of the magnet rotor 114 and made of a high-strength material such as titanium or an aluminum alloy.

A carbon wire 163 such as one made of carbon fibers, is coiled around the magnet rotor 114 and connected to the holder plates 113, the coils of the carbon wire 163 having a layer thickness in the range of from 1 mm to 2 mm.

Each of the bearing housings 108, 116 accommodate a fixed bearing 120 and a floating bearing 121. The axial ends of the rotor shaft 111 are rotatably supported by the floating bearings 121 which are rotatably disposed in the fixed bearings 120, respectively. The fixed bearings 120 and the floating bearings 121 have respective lubricant passages 120a, 121a and the bearing housings 108, 116 have main lubricant conduits 108a and 116a for supplying a lubricant to lubricate and cool sliding surfaces of the bearings 120, 121 and the sliding surfaces of the floating bearings 121 and the rotor shaft 111.

The floating bearings 121 are prevented by snap rings 122 from sliding in axial directions. Designated by 123 is a thrust bearing for the rotor shaft 111, and 125 a positioning ring therefor. The bearing assembly on the righthand end (FIG. 2) of the rotor shaft 111 is covered by a cover 124 with an oil seal ring 126 mounted therein. Cover 124 supports the rotor shaft 111.

Figure 4:
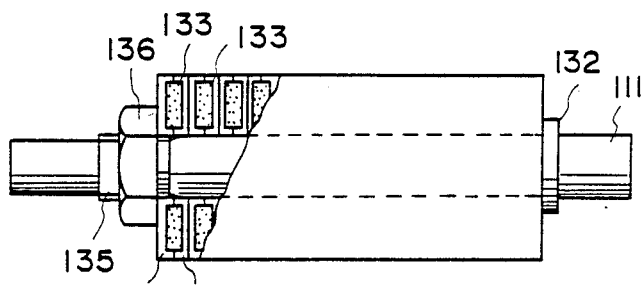
FIG. 4 is a front elevational view, partly in cross section, of a rotor according to another embodiment of the invention.
Figure 5:
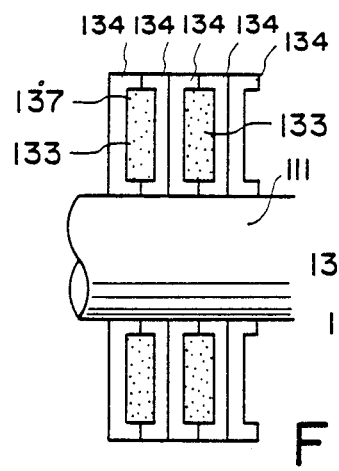
FIG. 5 is an enlarged fragmentary cross-sectional view of the rotor illustrated in FIG. 4.
Figure 6:
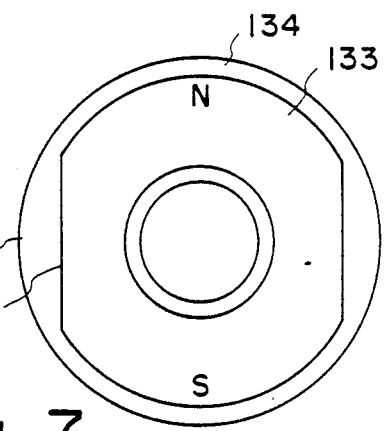
FIG. 6 is an enlarged side elevational view of the rotor of FIG. 4.

FIGS. 4 through 6 are illustrative of a rotor according to another embodiment of the present invention. The rotor includes a shoulder 132 integral with the rotor shaft 111, magnets 133, housing members 134 housing the magnets 133, a threaded portion 135 on the rotor shaft 111, and a nut 136 threaded over the threaded portion 135. The housing members 134 as they are held axially together are retained on the rotor shaft 111 between the nut 136 and the shoulder 132. Each of the magnets 133 is made of a rare earth metal having a high magnetic force and a high coercive force. As shown in FIG. 6, each magnet 133 is substantially disk-shaped with a central hole defined therein. After the magnet 133 has been magnetized, it is accommodated in recesses in the confronting pair of housing members 134. As illustrated in FIGS. 5 and 6, each housing member 134 comprises a disk-shaped member having a central hole in which the rotor shaft 111 is fitted. With the housing members 134 alternately oriented in opposite directions, the paired housing members 134 define a hollow space 137 serving to accommodate the magnet 133. The housing members 134 are made, such as of PSZ (partially stabilized zirconia), having a strength to withstand high-speed rotation. Since PSZ has a deflective strength of 130 Kg/mm or more and a modulus of elasticity comparable to that of iron, it also has a strength against fastening forces. The housing members 134 have flat surfaces 138 in their inner spaces for aligning the magnets 133 housed therein, and marks 139 impressed on outer surfaces thereof. The threaded portion 135 may be formed directly on the rotor shaft 111 or may be mounted by metallizing or force-fitting an alloy such as one of titanium. After the housing members 134 and the magnets 133 have been fitted over the rotor shaft 111 as shown in FIGS. 4 and 5, the nut 136 is threaded over the threaded portion 135 to fasten the housing members 134 and the magnets 133. The magnets 133 have a thickness slightly larger than the axial depth of the hollow space in the combined pair of housing members 134. Therefore, when fastened together by the nut 136, the magnets 133 are held under axial compression.

Figure 7:
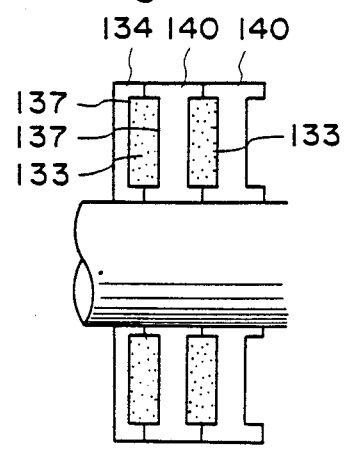
FIG. 7 is an enlarged fragmentary cross-sectional view of a rotor according to still another embodiment.

FIG. 7 shows a rotor according to still another embodiment of the present invention. The rotor of FIG. 7 is of substantially the same construction as the rotor of FIGS. 3 through 6, except that there are two types of housing members used. More specifically, the housing members 134 shown in FIG. 4 are disposed at the ends of the rotor, but housing members 140 having recesses defined in opposite surfaces thereof are mounted on the rotor shaft axially between the housing members 134.

A control circuit for controlling the generator device of the present invention will be described with reference to FIG. 8. According to the present invention, a reluctance generator can be used in place of the synchronous generator using permanent magnets shown in FIGS. 1 through 7. The reluctance generator of the invention will briefly be described. It is assumed that a rotor composed of permanent magnets or a field coil rotates within a three-phase armature winding. If an induced armature current is in phase with an electromotive force, then a magnetomotive force is generated by the armature current in a position which is 90° delayed from a magnetic flux produced by the permanent magnets or the field coil.

In view of this, a current which is 90° advanced in phase from a no-load induced electromotive force is generated at all times to provide a condition equivalent to the adjustment of a field current in an ordinary synchronous generator. Thus, a reluctance generator having the same function as that of the synchronous generator can be achieved without any field coil and permanent magnets.

Figure 8:
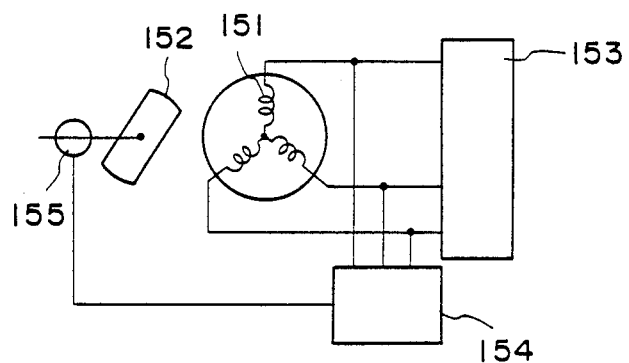
FIG. 8 is a circuit diagram of a control circuit for a reluctance generator in the generator device of the present invention.

The control circuit shown in FIG. 8 for such a reluctance generator includes armature coils 151 of the reluctance generator, a rotor 152, a load 153, a source 154 of advanced-phase reactive power, and a rotational position sensor 155. The rotational position sensor 155 detects a rotation 21 position of the rotor 152 for enabling the source 154 to supply an excitation current to the armature coils 151. Rotation of the rotor 152 causes the armature coils 151 to induce electromotive forces for thereby supplying electric power to the load 153.

The thermally insulative engine of the present invention is capable of supplying air under pressure to the engine cylinders when the engine rotates at a low speed and under a high load, unlike the conventional engine in which compressed air can be supplied to the engine cylinders only when the engine rotates at a high speed and under a high load. When the engine rotates at a medium speed and under a medium load or at a medium speed and under a low load, at which time it is not necessary to supply air under pressure to the engine cylinders, the exhaust energy can effectively be recovered and fed back to the engine output shaft. The arrangement for recovering the exhaust energy and feeding it back to the engine output shaft is subjected to a lower frictional loss than would be the conventional mechanical exhaust energy recovery device. In addition, any loss in the recovered energy due to an electric circuit resistance can be reduced by increasing the circuit voltage. Therefore, the combustion efficiency of the engine can be highly increased. The energy recovery device of the invention is quite simple in overall construction.

As described above, the exhaust gas emitted from the internal combustion engine is introduced into the scroll 102a of the exhaust turbine 101 and acts on the turbine wheel 103, and then is discharged out of the outlet port 102b. At this time, the turbine wheel 103 is rotated at a high speed by the energy of the exhaust gas. The rotation of the turbine wheel 103 is directly transmitted to the rotor shaft 111 integral with the wheel shaft 103a. Therefore, the magnet rotor 114 rotates at a high speed for highly efficient power generation.

Since the magnet rotor 114 is made of a rare earth metal, it has a strong magnetic force, and the generator can produce a large amount of electric power when the rotor 114 rotates at a high speed.

The rare earth magnet rotor 114 is covered on its outer circumference with the carbon wire 133, and hence can be prevented from being displaced or deformed radially outwardly. The magnet rotor 114 can also be prevented by the holder plates 113 from being displaced or deformed in axial directions. Accordingly, the magnet rotor 114 which is made of a mechanically weak rare earth metal is of a thin configuration and a high strength by being surrounded by the holder plates 133 and the carbon wire 33.

Since the magnet rotor 114 is of a cylindrical shape fitted over the rotor shaft 111, it produces a reduced windage loss and thus serves as an ideal generator rotor.

The rotor shown in FIGS. 3 through 5 includes magnets of a rare earth metal accommodated in the housing fitted over the rotor shaft, and has a high magnetic force and can withstand high-speed rotation. Therefore, the rotor is effective for use in a high-speed generator, and the generator with the rotor incorporated therein can produce high output at a high efficiency. Since the magnet housing is composed of a plurality of housing members of identical shape held together and fastened under axial compression to the rotor shaft, the rotor can therefore be manufactured in a simple process and at a reduced cost.

The turbine wheel 103, the wheel shaft 103a, and the rotor shaft 111 are constructed of ceramics, and hence are lightweight. The shafts 103a, 111 are also prevented effectively from being deformed under centrifugal forces. The generator device is therefore highly efficient in operation. Where the rotor shaft 111 is formed of a ceramics material having a large Young's modulus, it is prevented from being deformed eccentrically when it is rotated at a high speed.

Where the turbine wheel 103, the wheel shaft 103a, and the rotor shaft 111 are formed integrally of ceramics, they are not required to be assembled together, and are less susceptible to malfunctioning.

Furthermore, a reluctance generator using permanent magnets or a field coil and rotatable at high speeds can be provided.

Although certain preferred embodiments have been shown and described, it should be understood that many changes and modifications may be made therein without departing from the scope of the appended claims.

What we claim is:

1. An exhaust energy recovery and generator device for a thermally insulative engine having an exhaust passage and an output shaft, the device comprising:
    (a) a first exhaust turbine disposed in the exhaust passage of the thermally insulative engine and rotatable by the energy of an exhaust gas discharged from the thermally insulative engine, said first exhaust turbine having a wheel and a wheel shaft;
    (b) a generator having a rotor shaft coupled coaxially with the wheel shaft of said first exhaust turbine;
    (c) a converter operatively connected to said generator for converting alternating current into direct current;
    (d) an inverter operatively connected to said converter for converting direct current into alternating current;
    (e) a motor having a rotatable shaft and drivable by said generator via said converter and said inverter;
    (f) means connecting the rotatable shaft of said motor to the output shaft of the thermally insulative engine, whereby the energy of the exhaust gas recovered by said first exhaust turbine can be fed back to the output shaft of the thermally insulative engine through said generator, said converter, said inverter and said motor;
    (g) a body of silicon steel fitted over the rotor shaft of the generator; and
    (h) a stator coil, having a winding, for passing an armature current which is 90° advanced in phase through the winding to generate a no-load induced electromotive force, said generator thereby serving as a reluctance generator.

2. A device according to claim 1, wherein the turbine wheel of said exhaust turbine is constructed of ceramic material.

3. A device according to claim 1, wherein the rotor shaft of said generator is constructed of ceramic material.

4. A device according to claim 1, wherein the turbine wheel, the wheel shaft, and the rotor shaft are constructed integrally of ceramic material.

5. A device according to claim 1, further including oil floating bearings rotatably supporting the rotor shaft of said generator.

6. A device according to claim 1, further including:
a magnet rotor of a rare earth metal fitted over the rotor shaft of said generator, said magnet rotor having a circumferential surface;
holder members mounted on the rotor shaft and held against opposite ends of said magnet rotor; and
a carbon wire coiled around the circumferential surface of said magnet rotor.

7. A device according to claim 1, further comprising a magnet housing fitted over the rotor shaft of said generator, including:
housing members held axially together, each of said housing members having a central hole through which the rotor shaft extends and a recess defined in at least one surface thereof; and
magnets, each of said magnets disposed in the recesses of a pair of said housing members and having first and second magnetic poles, said magnets being aligned in an axial direction so that a first plane passes through the rotor shaft of said generator and the first magnetic pole of each of said magnets and a second plane passes through the rotor shaft of said generator and the second magnetic pole of each of said magnets.

8. A device according to claim 1, wherein the engine has an intake manifold and the device further including:
a second exhaust turbine connected to said first exhaust turbine and the exhaust passage of the thermally insulative engine and rotatable by the energy of exhuast gas discharged from the thermally insulative engine and from said first exhaust turbine;
an intake air compressor connected to said second exhaust turbine for supplying compressed air to the intake manifold of the thermally insulative engine; and
control means for selectively connecting the exhaust passage of the thermally insulative engine to said first and second exhaust turbines and for regulating said motor in accordance with predetermined conditions.

* * * * *